(12) United States Patent
Casey et al.

(10) Patent No.: US 8,210,214 B2
(45) Date of Patent: Jul. 3, 2012

(54) APPARATUS AND METHOD FOR PROVIDING HYDROGEN AT A HIGH PRESSURE

(75) Inventors: Daniel Glenn Casey, Kingwood, TX (US); Bhaskar Balasubramanian, Houston, TX (US)

(73) Assignee: Texaco Inc., San Ramon, CA (US)

( * ) Notice: Subject to any disclaimer, the term of this patent is extended or adjusted under 35 U.S.C. 154(b) by 913 days.

(21) Appl. No.: 11/965,405

(22) Filed: Dec. 27, 2007

(65) Prior Publication Data

US 2009/0165887 A1 Jul. 2, 2009

(51) Int. Cl.
*B67C 3/00* (2006.01)
*B01D 45/14* (2006.01)

(52) U.S. Cl. ............. 141/4; 48/61; 48/197 R; 48/199 R; 55/459.1; 95/34; 95/39; 95/269; 141/44

(58) Field of Classification Search ................ 55/459.1, 55/447; 95/34, 39, 269; 48/61, 197 R, 199 R; 141/2, 3, 4, 44; 220/581; 222/3, 71
See application file for complete search history.

(56) References Cited

U.S. PATENT DOCUMENTS

| | | | | |
|---|---|---|---|---|
| 4,070,171 A * | 1/1978 | Wikdahl | ......................... | 55/419 |
| 4,092,130 A * | 5/1978 | Wikdahl | ......................... | 95/34 |
| 6,305,442 B1 * | 10/2001 | Ovshinsky et al. | ........... | 141/231 |
| 6,432,283 B1 * | 8/2002 | Fairlie et al. | ............... | 204/230.2 |
| 6,810,925 B2 * | 11/2004 | Graham et al. | ................ | 141/98 |
| 6,899,146 B2 * | 5/2005 | Bingham et al. | ............... | 141/11 |
| 7,124,790 B2 * | 10/2006 | Bushko | ........................... | 141/82 |
| 7,128,103 B2 * | 10/2006 | Mitlitsky et al. | .............. | 141/248 |
| 7,275,569 B2 * | 10/2007 | Hobbs | ............................. | 141/97 |
| 7,287,558 B2 * | 10/2007 | Hobbs | ............................. | 141/97 |
| 2003/0041518 A1 * | 3/2003 | Wallace et al. | ............. | 48/197 R |
| 2003/0164202 A1 * | 9/2003 | Graham et al. | ................ | 141/98 |
| 2003/0175564 A1 * | 9/2003 | Mitlitsky et al. | .............. | 429/21 |
| 2003/0204993 A1 * | 11/2003 | Holland et al. | ............. | 48/127.9 |
| 2004/0049982 A1 * | 3/2004 | Shimizu et al. | .................... | 48/61 |
| 2006/0137245 A1 * | 6/2006 | Kenefake et al. | .................. | 48/61 |
| 2006/0156627 A1 * | 7/2006 | Brantley et al. | .................... | 48/61 |
| 2006/0174965 A1 * | 8/2006 | Hobbs | ............................. | 141/18 |
| 2007/0137590 A1 * | 6/2007 | Vetrovec | ..................... | 123/25 A |
| 2008/0096063 A1 * | 4/2008 | Hamada et al. | ................. | 429/19 |
| 2009/0032135 A1 * | 2/2009 | Iida et al. | ........................... | 141/5 |
| 2010/0307636 A1 * | 12/2010 | Uemura | ............................ | 141/4 |

FOREIGN PATENT DOCUMENTS

| | | | | |
|---|---|---|---|---|
| JP | 2001026401 A | * | 1/2001 |
| JP | 2006283886 A | * | 10/2006 |
| JP | 2006312373 A | * | 11/2006 |
| JP | 2007064473 A | * | 3/2007 |
| JP | 2007127209 A | * | 5/2007 |
| JP | 2007139145 A | * | 6/2007 |
| JP | 2007309375 A | * | 11/2007 |

* cited by examiner

*Primary Examiner* — Duane Smith
*Assistant Examiner* — Sonji Turner
(74) *Attorney, Agent, or Firm* — Melissa Patangia; Christopher D. Northcutt; Andrews Kurth LLP

(57) ABSTRACT

An apparatus and method for providing a hydrogen rich gas stream at a high pressure for use by hydrogen vehicles or other devices requiring hydrogen rich feed streams are disclosed in the present invention. As the pressure of gaseous hydrogen is increased, the temperature of the gaseous hydrogen also increases due to the heat of compression. The apparatus and method of the present invention utilize localized cooling via a vortex tube to cool the gaseous hydrogen caused by the increase in pressure.

17 Claims, 4 Drawing Sheets

APPARATUS AND METHOD FOR PROVIDING HYDROGEN AT A HIGH PRESSURE

FIELD OF THE INVENTION

The present invention relates generally to providing a hydrogen rich gas stream at a high pressure for use by hydrogen vehicles or other devices requiring hydrogen rich feed streams and in particular to an apparatus and method for dispensing a hydrogen rich gas stream at 700 bar for use by hydrogen vehicles.

BACKGROUND OF THE INVENTION

Hydrogen is utilized in a wide variety of industries ranging from aerospace to food production to oil and gas production and refining. Hydrogen is used in these industries as a propellant, an atmosphere, a carrier gas, a diluents gas, a fuel component for combustion reactions, a fuel for fuel cells, as well as a reducing agent in numerous chemical reactions and processes. In addition, hydrogen is being considered as an alternative fuel for power generation because it is renewable, abundant, efficient, and unlike other alternatives, produces zero emissions. While there is wide-spread consumption of hydrogen and great potential for even more, a disadvantage which inhibits further increases in hydrogen consumption is the absence of a hydrogen infrastructure to provide widespread generation, storage and distribution.

One way to overcome this difficulty is through the operation of hydrogen energy stations. At hydrogen energy stations, hydrogen generators such as reformers are used to convert hydrocarbons to a hydrogen rich gas stream. Hydrocarbon-based fuels, such as natural gas, LPG, gasoline, and diesel, require conversion processes to be used as fuel sources for most fuel cells. Current art uses multi-step processes combining an initial conversion process with several clean-up processes. The initial process is most often steam reforming (SR), autothermal reforming (ATR), catalytic partial oxidation (CPOX), or non-catalytic partial oxidation (POX), or combinations thereof. The clean-up processes are usually comprised of a combination of desulphurization, high temperature water-gas shift, low temperature water-gas shift, selective CO oxidation, selective CO methanation or combinations thereof. Alternative processes for recovering a purified hydrogen-rich reformate include the use of hydrogen selective membrane reactors and filters. The gaseous hydrogen is then stored in stationary storage vessels at the hydrogen energy stations to provide inventory to fuel hydrogen vehicles.

Currently, gaseous hydrogen is typically dispensed to hydrogen vehicles at a pressure of 350 bar. However, in order to extend the range of hydrogen vehicles, it is desirable to increase the storage density of gaseous hydrogen in hydrogen vehicles. Therefore, it is desirable to dispense gaseous hydrogen to hydrogen vehicles at an increased pressure of 700 bar. This increase in pressure will require cooling of the gaseous hydrogen during dispensing as the temperature of the gaseous hydrogen will increase due to the heat of compression. Conventional heat transfer of this fast flowing stream would require a very large heat exchanger. In addition, the mechanical cooler for this heat exchanger would have to be located remotely from the dispenser or be constructed to meet Class 1, Division 2, Group B electrical code as defined by OSHA regulations.

In addition to increasing the storage density of gaseous hydrogen in hydrogen vehicles, it is also desirable to use cold gaseous hydrogen ("cryocooled") storage tanks to increase the amount of gaseous hydrogen stored per unit volume versus conventional stationary storage tanks while avoiding the energy penalties associated with hydrogen liquefaction. The cold gaseous hydrogen ("cryocooled") storage tanks store gaseous hydrogen at a high pressure.

The present invention addresses these challenges by disclosing an apparatus and method for providing a hydrogen rich gas stream at a high pressure for use by hydrogen vehicles or other devices requiring hydrogen rich feed streams.

SUMMARY OF THE INVENTION

In the present invention, an apparatus and method for providing a hydrogen rich gas stream at a high pressure for use by hydrogen vehicles or other devices requiring hydrogen rich feed streams are disclosed. As the pressure of gaseous hydrogen is increased, the temperature of the gaseous hydrogen also increases due to the heat of compression. The apparatus and method of the present invention utilize localized cooling via a vortex tube to cool the gaseous hydrogen caused by the increase in pressure. In the present invention, the gaseous hydrogen stream is first introduced into a vortex tube which separates the compressed hydrogen into cold and hot streams.

In one embodiment, the cold hydrogen stream may then be dispensed to a hydrogen vehicle while the hot hydrogen stream may be routed to a surge tank for subsequent recompression, storage, and later re-dispensing. The apparatus of the present invention can be used to dispense gaseous hydrogen to hydrogen vehicles at a pressure of 700 bar. In addition, the apparatus of the present invention could be used to dispense gaseous hydrogen to hydrogen vehicles at some intermediate pressure between the current dispensing pressure of 350 bar and the current target of 700 bar.

In another embodiment, the cold hydrogen stream may then be used to fill a cold gaseous hydrogen ("cryocooled") storage tank while the hot hydrogen stream may be routed to a surge tank for subsequent recompression, storage, and later re-dispensing.

The use of a vortex tube allows not only for the localized cooling of the gaseous hydrogen but also allows for the control of the sizing of the hydrogen energy station when the size (footprint) of the hydrogen energy station must be considered.

BRIEF DESCRIPTION OF THE FIGURES

The description is presented with reference to the accompanying figures in which.

DETAILED DESCRIPTION OF THE INVENTION

The present invention discloses an apparatus and method for providing a hydrogen rich gas stream at a high pressure for use by hydrogen vehicles or other devices requiring hydrogen rich feed streams.

Figure 1:
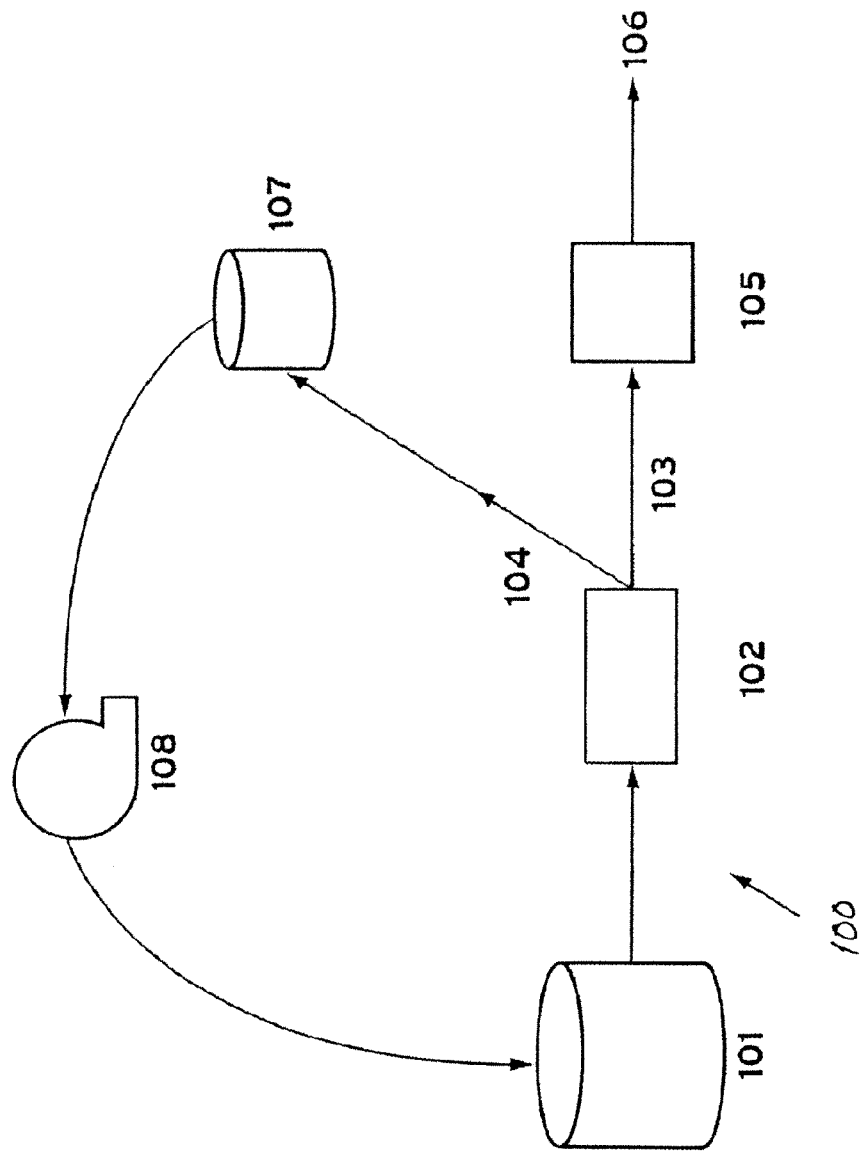
FIG. 1 depicts one embodiment of the apparatus of the present invention for dispensing gaseous hydrogen at 700 bar for use by hydrogen vehicles.

With reference to FIG. 1, FIG. 1 depicts one embodiment of the apparatus and method of the present invention for dispensing gaseous hydrogen at 700 bar for use by hydrogen vehicles. FIG. 1 depicts a hydrogen energy station 100 for generating, storing, and dispensing gaseous hydrogen for use by hydrogen vehicles or other devices requiring hydrogen rich feed streams. First, the gaseous hydrogen is generated (not illustrated) at the hydrogen station 100 and stored in at least one stationary storage tank 101. In addition, the gaseous hydrogen may be generated off-site and transported to the hydrogen energy station 100.

Prior to dispensing the gaseous hydrogen at a pressure of 700 bar to a hydrogen vehicle 106, the gaseous hydrogen is introduced into a least one vortex tube 102. In the vortex tube 102, the gaseous hydrogen is separated into a cold hydrogen stream 103 and a hot hydrogen stream 104. As is known in the art, vortex tubes utilize vortex action to separate compressed air into a cold stream and a hot stream. For example, Exair Corporation and ITW Air Management manufactures products such as vortex tubes. The present invention adapts this compressed air technology, vortex tubes, for use at a hydrogen energy station.

Figure 3:
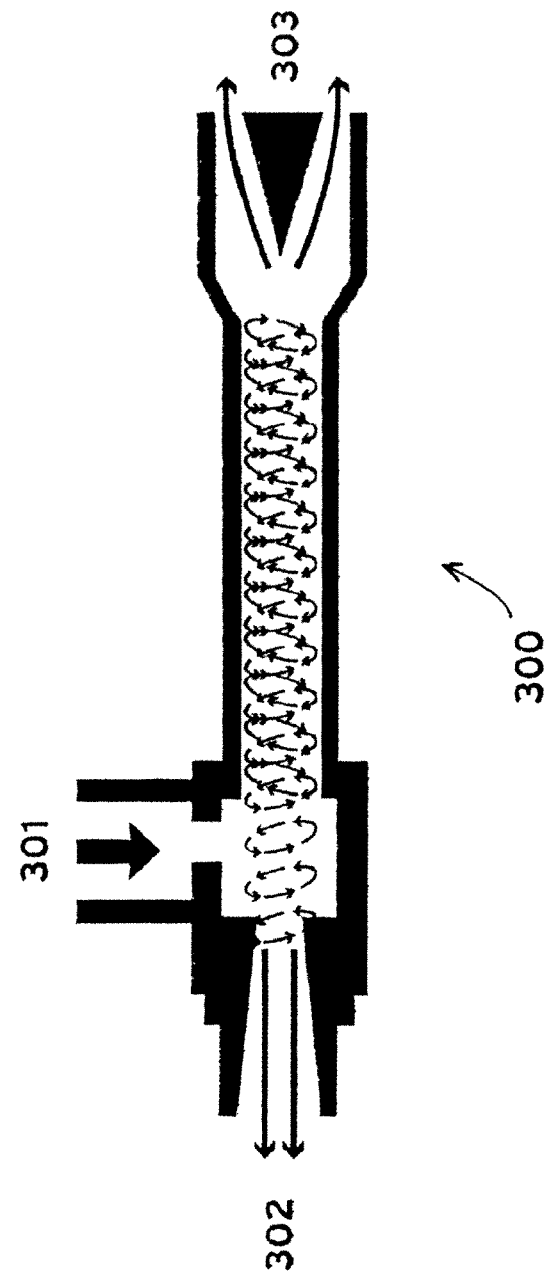
FIG. 3 depicts an example of the vortex tube of the apparatus of the present invention.

An example of the vortex tube 300 of the apparatus of the present invention is depicted in FIG. 3. Gaseous hydrogen 301 enters the vortex tube 300 and is separated into at least one cold hydrogen stream 302 and at least one hot hydrogen stream 303.

Fluid (air) that rotates around an axis (like a tornado) is called a vortex. A Vortex Tube creates cold air and hot air by forcing compressed air through a generation chamber which spins the air centrifugally along the inner walls of the Tube at a high rate of speed (1,000,000 RPM) toward the control valve. A percentage of the hot, high-speed air is permitted to exit at the control valve. The remainder of the (now slower) air stream is forced to counterflow up through the center of the high-speed air stream, giving up heat, through the center of the generation chamber finally exiting through the opposite end as extremely cold air. Vortex tubes generate temperatures down to 100° F. below inlet air temperature. A control valve located in the hot exhaust end can be used to adjust the temperature drop and rise for all Vortex Tubes.

The cold hydrogen stream 103 is routed to a dispenser 105 and dispensed to a hydrogen vehicle or other devices requiring hydrogen rich feed stream 106. The hot hydrogen stream 104 is routed to a surge tank 107. The hot hydrogen stream 104 from the surge tank 107 is then recompressed via a compressor 108 and routed back to at least one stationary storage tank 101 for later re-dispensing.

Figure 1A:
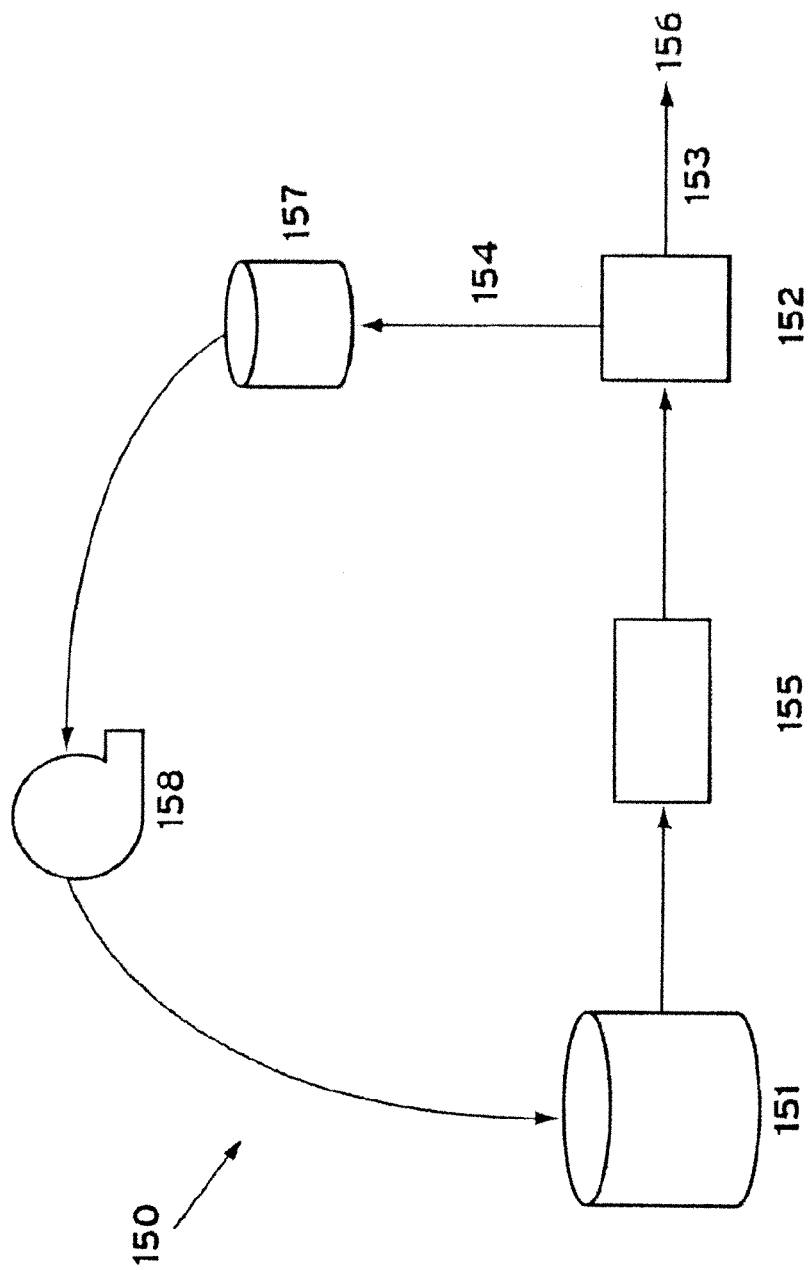
FIG. 1A depicts another embodiment of the apparatus of the present invention for dispensing gaseous hydrogen at 700 bar for use by hydrogen vehicles.

With reference to FIG. 1A, FIG. 1A depicts another embodiment of the apparatus and method of the present invention for dispensing gaseous hydrogen at 700 bar for use by hydrogen vehicles. FIG. 1A depicts a hydrogen energy station 150 for generating, storing, and dispensing gaseous hydrogen for use by hydrogen vehicles or other devices requiring hydrogen rich feed streams. First, the gaseous hydrogen is generated (not illustrated) at the hydrogen station 150 and stored in at least one stationary storage tank 151. In addition, the gaseous hydrogen may be generated off-site and transported to the hydrogen energy station 150.

Prior to dispensing the gaseous hydrogen at a pressure of 700 bar to a hydrogen vehicle 156, the gaseous hydrogen is first introduced into a dispenser 155. Following the dispenser, the gaseous hydrogen is introduced into at least one vortex tube 152. In the vortex tube 152, the gaseous hydrogen is separated into a cold hydrogen stream 153 and a hot hydrogen stream 154.

The hot hydrogen stream 154 is routed to a surge tank 157. The hot hydrogen stream 154 from the surge tank 157 is then recompressed via a compressor 158 and routed back to at least one stationary storage tank 151 for later re-dispensing. The cold hydrogen stream 153 is dispensed to a hydrogen vehicle 156 or other devices requiring hydrogen rich feed stream. In order to determine the amount of gaseous hydrogen is dispensed to the vehicle 156 a meter (not illustrated) must be incorporated into or placed after the vortex tube 152.

Figure 2:
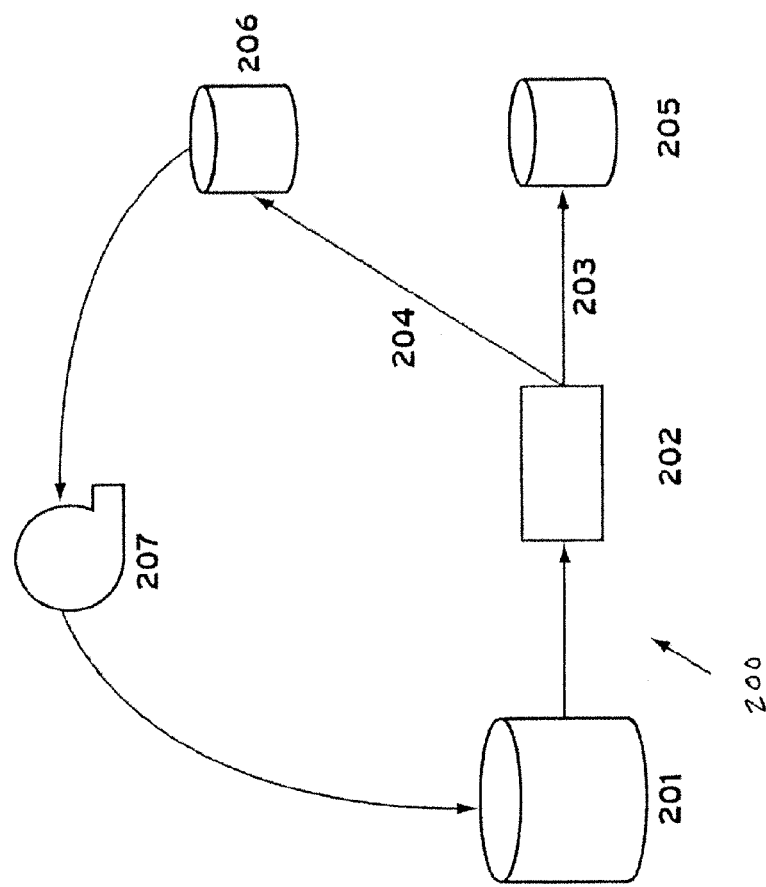
FIG. 2 depicts another embodiment of the apparatus of the present invention for filling a high-pressure cold gaseous hydrogen ("cryocooled") storage tank.

With reference to FIG. 2, FIG. 2 depicts another embodiment of the apparatus of the present invention for filling a high-pressure cryocooled storage tank. FIG. 2 depicts a hydrogen energy station 200 for generating, storing, and dispensing gaseous hydrogen for use by hydrogen vehicles or other devices requiring hydrogen rich feed streams. First, the gaseous hydrogen is generated (not illustrated) at the hydrogen station 200 and stored in at least one stationary storage tank 201. In addition, the gaseous hydrogen may be generated off-site and transported to the hydrogen energy station 200.

Prior to filling at least one cold gaseous hydrogen ("cryocooled") storage tank 205, the gaseous hydrogen is introduced into a least one vortex tube 202. In the vortex tube 202, the gaseous hydrogen is separated into a cold hydrogen stream 203 and a hot hydrogen stream 204.

The cold hydrogen stream 203 is routed to the cold gaseous hydrogen ("cryocooled") storage tank 205. The hot hydrogen stream 204 is routed to a surge tank 206. The hot hydrogen stream 204 from the surge tank 206 is then recompressed via a compressor 207 and routed back to at least one stationary storage tank 201.

While the methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A hydrogen dispensing apparatus comprising:
   at least one storage tank containing hydrogen;
   at least one vortex tube and at least one dispenser connected in series to said at least one storage tank, wherein said at least one vortex tube produces a hot hydrogen stream and a cold hydrogen stream;
   at least one hydrogen vehicle that receives said cold hydrogen stream before any mixing with another gas;
   at least one surge tank connected to said at least one vortex tube and that receives said hot hydrogen stream; and
   at least one compressor connected to said at least one surge tank.

2. The hydrogen dispensing apparatus of claim 1 wherein said hydrogen dispensing apparatus is located at a hydrogen energy station.

3. The hydrogen dispensing apparatus of claim 2 wherein said hydrogen is generated at said hydrogen energy station.

4. The hydrogen dispensing apparatus of claim 2 wherein said hydrogen is generated off-site.

5. A hydrogen dispensing method comprising:
   introducing hydrogen from at least one storage tank to at least one vortex tube;
   separating said hydrogen into at least one cold hydrogen stream and at least one hot hydrogen stream via said at least one vortex tube;
   providing said at least one cold hydrogen stream to at least one hydrogen vehicle before mixing said cold hydrogen stream with any other gas;

routing said at least one hot hydrogen stream to at least one surge tank:

routing said at least one hot hydrogen stream from said at least one surge tank to at least one compressor; and routing said at least one hot hydrogen stream from said at least one compressor to said at least one stationary storage tank.

6. The hydrogen dispensing method of claim 5 wherein said hydrogen is located at a hydrogen energy station.

7. The hydrogen dispensing method of claim 6 wherein said hydrogen is generated at said hydrogen energy station.

8. The hydrogen dispensing method of claim 6 wherein said hydrogen is generated offsite.

9. The hydrogen dispensing method of claim 5 wherein said at least one cold hydrogen stream is provided to said at least one hydrogen vehicle at 350-700 bar.

10. A cold hydrogen storage tank filling apparatus comprising:

at least one storage tank containing hydrogen:

at least one vortex tube connected to said at least one storage tank and that produces a hot hydrogen stream and a cold hydrogen stream;

at least one cold hydrogen storage tank that receives said cold hydrogen stream before any mixing with another gas;

at least one surge tank connected to said at least one vortex tube and that receives said hot hydrogen stream; and at least one compressor connected to said at least one surge tank.

11. The cold hydrogen storage tank filling apparatus of claim 10 wherein said cold hydrogen storage tank filling apparatus is located at a hydrogen energy station.

12. The cold hydrogen storage tank filling apparatus of claim 11 wherein said hydrogen is generated at said hydrogen energy station.

13. The cold hydrogen storage tank filling apparatus of claim 11 wherein said hydrogen is generated off-site.

14. A cold hydrogen storage tank filling method comprising:

introducing hydrogen from at least one storage tank to at least one vortex tube;

separating said hydrogen into at least one cold hydrogen stream and at least one hot hydrogen stream via said at least one vortex tube;

filling at least one cold hydrogen storage tank with said at least one cold hydrogen stream before mixing said cold hydrogen stream with any other gas;

routing said at least one hot hydrogen stream to at least one surge tank;

routing said at least one hot hydrogen stream from said at least one surge tank to at least one compressor; and routing said at least one hot hydrogen stream from said at least one compressor to said at least one stationary storage tank.

15. The cold hydrogen storage tank filling method of claim 14 wherein said hydrogen is located at a hydrogen energy station.

16. The cold hydrogen storage tank filling method of claim 15 wherein said hydrogen is generated at said hydrogen energy station.

17. The cold hydrogen storage tank filling method of claim 15 wherein said hydrogen is generated off-site.

* * * * *